(12) United States Patent
Schmitz et al.

(10) Patent No.: US 7,487,793 B2
(45) Date of Patent: Feb. 10, 2009

(54) VALVE ASSEMBLY WITH OVERFILL PROTECTION DEVICE AND CAPACITIVE LIQUID LEVEL GAUGE

(75) Inventors: Jean-Claude Schmitz, Heisdorf (LU); Linze Hoekstra, Ede (NL)

(73) Assignee: Torrent Trading Ltd., Tortola (VG)

( * ) Notice: Subject to any disclaimer, the term of this patent is extended or adjusted under 35 U.S.C. 154(b) by 0 days.

(21) Appl. No.: 11/617,083

(22) Filed: Dec. 28, 2006

(65) Prior Publication Data

US 2007/0107786 A1    May 17, 2007

Related U.S. Application Data

(62) Division of application No. 11/000,655, filed on Dec. 1, 2004, now Pat. No. 7,240,690.

(51) Int. Cl.
*F16K 37/00* (2006.01)

(52) U.S. Cl. .................. 137/558; 137/392; 73/304 C; 340/620

(58) Field of Classification Search ............ 137/392, 137/558; 73/304 C, 305, 313, 319; 340/620
See application file for complete search history.

(56) References Cited

U.S. PATENT DOCUMENTS

| | | | |
|---|---|---|---|
| 2,731,030 A | 1/1956 | Phillips et al. | |
| 3,437,771 A | 4/1969 | Nusbaum | |
| 3,511,090 A * | 5/1970 | Ehrenfried et al. | 73/301 |
| 4,159,786 A * | 7/1979 | Biddle et al. | 222/64 |
| 4,399,699 A | 8/1983 | Fujishiro | |
| 4,483,367 A | 11/1984 | Ross et al. | |
| 4,591,946 A * | 5/1986 | Pope | 361/284 |
| 4,730,489 A * | 3/1988 | Hoekstra | 73/304 C |
| 5,090,212 A | 2/1992 | Keltner et al. | |
| 5,487,404 A | 1/1996 | Kerger | |
| 5,701,932 A * | 12/1997 | Bourscheid et al. | 137/558 |
| 5,747,689 A | 5/1998 | Hampo et al. | |

(Continued)

FOREIGN PATENT DOCUMENTS

GB         385265         12/1932

OTHER PUBLICATIONS

Search Report From Corresponding European Application No. 05111523 (Mar. 9, 2006).

*Primary Examiner*—Stephen M Hepperle
*Assistant Examiner*—Craig M Schneider
(74) *Attorney, Agent, or Firm*—Polster, Lieder, Woodruff & Lucchesi, L.C.

(57) ABSTRACT

A valve assembly, such as a tap for a liquefied gas cylinder, includes an overfill protection device and a liquid level gauge having an electrode assembly comprising a pair of lamellar electrodes mounted closely adjacent a housing member of the overfill protection device and deflectable into close proximity with a float of the overfill protection device for insertion into the gas cylinder. A circuit board is provided, preferably mounted on the electrode assembly, and has an electronic converter circuit for measuring the electrical capacitance between the electrodes and producing in response to the measured capacitance an output signal representative of the liquid level in the container. A display means is mounted on a body of the valve assembly or remote therefrom, to indicate the liquid level in the container in response to the output signal from the electronic converter circuit.

31 Claims, 10 Drawing Sheets

U.S. PATENT DOCUMENTS

| | | | |
|---|---|---|---|
| 5,781,019 A * | 7/1998 | Telder | 324/643 |
| 5,832,953 A | 11/1998 | Lattner et al. | |
| 6,026,841 A | 2/2000 | Kozik | |
| 6,178,818 B1 * | 1/2001 | Plochinger | 73/304 C |
| 6,640,829 B1 | 11/2003 | Kerger | |
| 2004/0089351 A1 | 5/2004 | Tseng | |
| 2006/0169325 A1 | 8/2006 | Schmitz | |

* cited by examiner

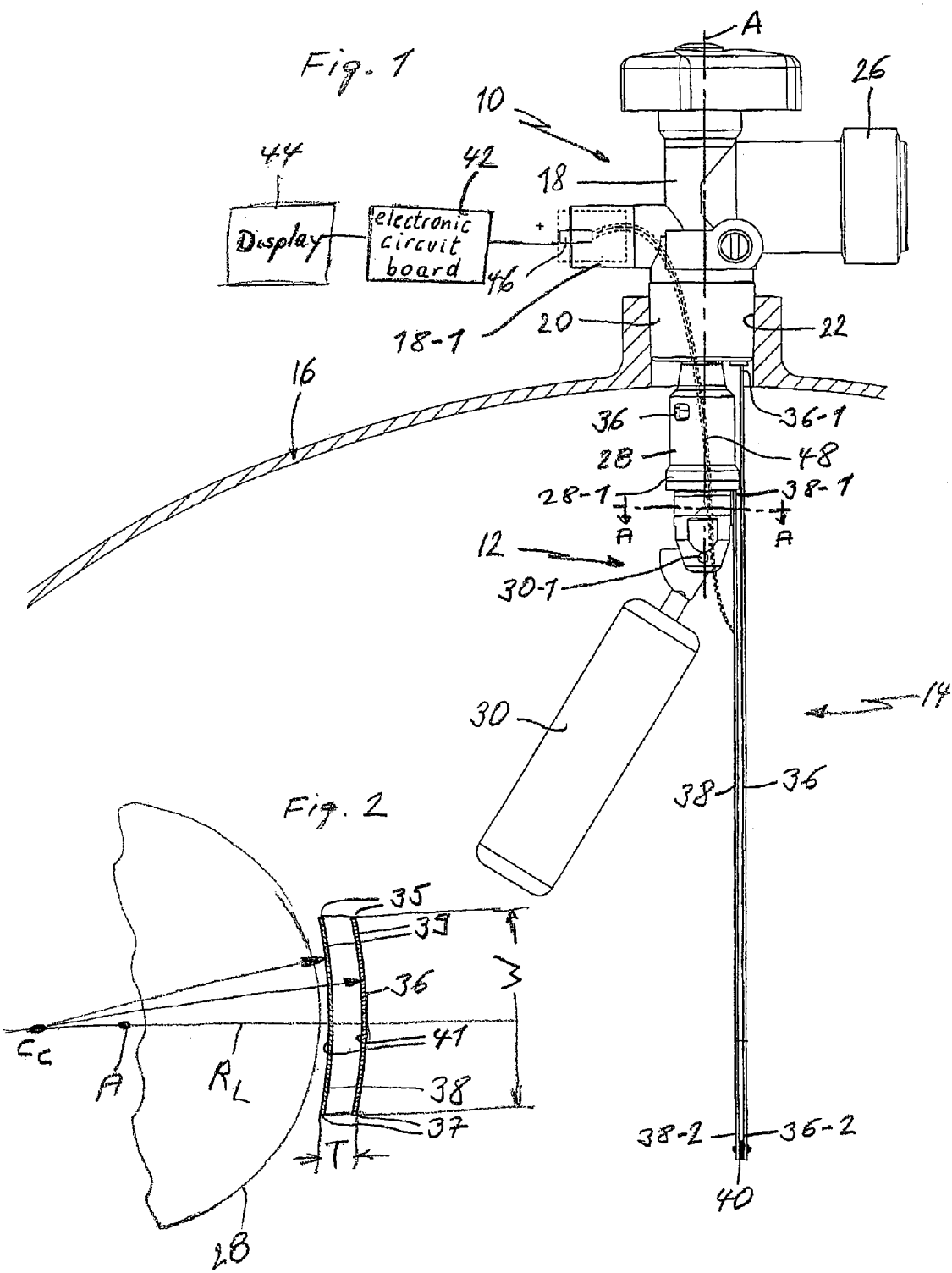

VALVE ASSEMBLY WITH OVERFILL PROTECTION DEVICE AND CAPACITIVE LIQUID LEVEL GAUGE

CROSS-REFERENCE TO RELATED APPLICATIONS

This is a divisional of co-pending U.S. application Ser. No. 11/000,655 which was filed on Dec. 1, 2004, and which is incorporated herein by reference.

STATEMENT REGARDING FEDERALLY SPONSORED RESEARCH OR DEVELOPMENT

Not Applicable.

BACKGROUND OF THE INVENTION

The present invention relates to a valve assembly for a fluid container and concerns especially a gas tap for a liquefied gas cylinder having an overfill protection device to prevent overfilling of the container or gas cylinder, as well as a capacitive liquid level gauge for determining the level of the liquefied gas remaining in the container or gas cylinder.

Description of the Prior Art

A gas valve assembly having an overfill protection device is well known and disclosed for example in U.S. Pat. No. 5,487,404 issued on Jan. 30, 1996 to Leon Kerger and also in U.S. Pat. No. 6,640,829 issued on Nov. 4, 2003 to Loll Kerger, both of which are incorporated herein by reference. In each of these US patents the gas valve has a manually actuatable valve element that can be opened to permit filling of the gas cylinder or to discharge gas therefrom. Mounted below the body of the gas valve is an overfill protection device (OPD) having a valve element movable into an open position by the liquefied gas to be filled into the gas container and a pivotable angularly mounted float effecting closing of the valve element when the liquefied gas reaches a predetermined level within the gas cylinder.

Known in the prior art is also a gas valve having a built-in capacitive level gauge for determining the level of the liquefied gas remaining within a gas cylinder, note for example the U.S. Pat. No. 5,701,932 issued on Dec. 30, 1997 to George Burscheid et al. Further, there is disclosed in U.S. Pat. No. 4,730,489 issued on Mar. 15, 1988 to Linze Hoekstra a variable liquid level capacitor sensor. According to these two U.S. Pat. Nos. 5,701,932 and 4,730,489 the capacitive level sensor comprises two circular elements one disposed within the other. The two circular elements forming electrodes of an electrical capacitor whose capacitance changes as the length of the electrodes immersed in the liquefied gas varies. In the known capacitive level sensors the capacitance is measured and an electrical circuit converts the measured capacitance into a level output signal that is displayed on a display means.

There is a need for a gas valve having an overfill protection device (OPD) as well as a liquefied gas level sensing device so that the remaining volume of liquefied gas within the gas cylinder can be quickly and easily determined without the need for weighing the gas cylinder.

Unfortunately, the external diameters or dimensions of the overfill protection devices are very close to the gas cylinder opening into which a base end of the valve body is threaded when mounting the gas valve to the gas cylinder. In effect, the overfill protection device and particularly the float and a stationary housing or body member thereof must be inserted through the cylinder opening into the cylinder interior, which opening is but slightly larger than the external diameter of the parts of the overfill protection device so that insufficient place remains for mounting a level sensor, such as a capacitive level sensor as disclosed in the U.S. Pat. Nos. 5,701,932 and 4,730,489 referred to above, on the valve body adjacent the overfill protection device so that both the overfill protection device and the capacitive level sensor can be inserted through the gas cylinder opening into the interior of the gas cylinder, unless the diameter of the gas cylinder opening is substantially enlarged, which is undesired.

Of course, it would be possible to use a separate level sensor or gauge, but this would require an additional opening for the sensor or gauge in the container.

BRIEF SUMMARY OF THE INVENTION

Generally stated, the invention provides a valve assembly for a fluid container, especially a gas tap for a liquefied gas cylinder, comprising:

a valve body having a longitudinal axis and a base end for securing the valve body in an opening of a container;

an overfill protection device having a housing member secured to the valve body and depending axially downwardly therefrom along said longitudinal axis, said valve body and housing member constituting a fixed structure of said valve assembly, and said overfill protection device having a float pivotable relative to said housing member about a pivot axis and extending downwardly from said housing member at an angle relative thereto, said overfill protection device being adapted to be inserted through said opening into said container, said opening having a small diameter that is but slightly larger than the maximum outer diameter of said overfill protection device; and a capacitive liquid level gauge for detecting the liquid level in the container, said level gauge being secured to said fixed structure and extending normally downwardly therefrom in the direction of said longitudinal axis passed and beyond said float, said level gauge comprising two elongate, relatively thin, lamellar, conductive electrodes, said electrodes being normally straight and parallel to one another in the direction of the longitudinal axis and spaced from one another, said lamellar electrodes having opposite side surfaces and being disposed on the same side of the overfill protection device and oriented with said side surfaces extending substantially transversely to a plane containing said longitudinal axis, said level gauge further being positioned, in axial projection, in close proximity to said housing member and being deflectable laterally to extend in close proximity alongside said float so as to permit insertion of the overfill protection device and said level gauge manually held closely side-by-side through said small diameter opening into said container.

According to another aspect of the invention there is provided a valve assembly for a fluid container, especially a gas tap for a liquefied gas cylinder, comprising:

a valve body having a longitudinal axis and a base end for securing a valve body in an opening of a container;

an overfill protection device having a float mounted on a housing member secured to the valve body and depending axially therefrom along said longitudinal axis, said valve body and housing member constituting a fixed structure of said valve assembly, said overfill protection device being adapted to be inserted through said opening into said container, said opening having a small diameter that is but slightly larger than the maximum outer diameter of said overfill protection device; and a capacitive liquid level gauge for detecting the liquid level in the container, said level gauge being secured to said fixed structure and extending normally downwardly therefrom in the direction of the longitudinal axis passed and beyond said overfill protection device, said level gauge comprising two elongate, relatively thin, lamellar, conductive electrodes, said electrodes being normally straight and parallel to one another in the direction of their length, said electrodes being oriented relative to said overfill protection device with a side surface of each electrode facing towards the overfill protection device, and said electrodes overlying one another in closely spaced relationship and being arranged relative to the overfill protection device so as to allow for insertion of the level gauge held closely adjacent the overfill protection device through said small diameter opening into said container.

The capacitive level gauge consisting of the lamellar electrodes has a very limited dimension or thickness in a direction transverse to its longitudinal dimension and is mounted closely adjacent to the overfill protection device so that it can be inserted into the container or gas cylinder through an opening that is not substantially larger than the maximum external diameter of the overfill protection device. While the electrodes may have flat side surfaces, both electrodes are preferably trough-shaped or channel-shaped in cross-section and are oriented to face with the concave sides thereof towards the overfill protection device. Both electrodes overly one another and may be identical in cross-sectional shape.

One or both electrodes may be made of flexible spring band steel stock material. The spring force of the electrodes maintaining the electrodes stably in a straight orientation parallel with respect to one another.

Preferably, the second electrode is shorter than the first electrode which is secured at a proximal end thereof to the valve body, both electrodes are electrically non-conductively interconnected proximate a distal end thereof and the second electrode is connected at its proximal end to an electrically non-conductive housing member of the overfill protection device or is connected by an electrically non-conductive connector to the first electrode. In the embodiment in which the second electrode is connected to a housing member of the overfill protection device both electrodes are flexible and can be manually deflected into close proximity of the float of the overfill protection device for insertion into a container or gas cylinder. When the level gauge is in the container the spring force of the electrodes returns the same to their normal straight and parallel orientation and retains them stably in this orientation. In the embodiment wherein the second electrode is connected at its proximal end to the first electrode, both electrodes may be flexible but it is sufficient for the first electrode to be flexible or, instead of being flexible, it can be provided with a pivot hinge to permit pivoting of a distal portion of the first electrode (carrying the second electrode) to a position closely adjacent the float of the overfill protection device for insertion into the gas cylinder. A spring is provided for returning the distal portion of the first electrode, which supports the second electrode, into its normal position aligned with a proximal portion of the first electrode. One or both electrodes may also be flexible in the pivot hinge embodiment.

The valve assembly has a circuit board, preferably mounted on the level gauge, having an electronic converter circuit for measuring the electrical capacitance between the two electrodes and producing in response to the measured capacitance an output signal representative of the liquid level in the container. A single wire connection to the circuit board is provided and the electrical return being through the valve body consisting of electrically conductive material. Preferably a display means is mounted directly on the valve body for indicating the liquid level in the container in response to the output signal from the electronic converter circuit. However, the display means may also be disposed remote from the valve body.

According to another aspect of the invention the capacitive level sensor can also be used in combination with a valve without an overfill protection device (OPD).

According to this aspect of the invention there is provided a valve assembly for a fluid container, especially a gas tap for a liquefied gas cylinder, comprising:

a valve body having a longitudinal axis and a base end for securing the valve body in an opening of the container; and a capacitive liquid level gauge for detecting the liquid level in the container, said level gauge being secured to said valve body end and extending downwardly therefrom in the direction of the longitudinal axis, said level gauge comprising two elongate, relatively thin lamellar, conductive electrodes, said electrodes having a length and normally remaining in straight parallel condition spaced apart from one another in the direction of the length thereof.

According to still another aspect of the invention the capacitive level gauge may be used independently of a valve. Following this aspect of the invention there is provided a capacitive liquid level gauge for sensing the liquid level in a fluid container, especially in a pressurized liquefied gas cylinder, comprising:

a gauge head; and an electrode assembly secured to said gauge head and depending downwardly therefrom, said electrode assembly comprising a pair of elongate, relatively thin, lamellar conductive electrodes, said electrodes each having a length and being formed to normally remain straight spaced apart from one another and parallel to one another in the direction of the length thereof.

BRIEF DESCRIPTION OF THE SEVERAL VIEWS OF THE DRAWINGS

The invention will now be described in greater detail with reference to the drawings, wherein:

FIG. 1 is an elevational side view of the gas valve with overfill protection device and level gauge mounted in a container opening and with an electronic circuit board and a display means represented schematically.

FIG. 2 is an enlarged cross-sectional view in the direction of the arrows A-A in FIG. 1, showing the gauge electrodes and a portion of the housing of the overfill protection device.

DETAILED DESCRIPTION OF THE INVENTION

Figure 3:
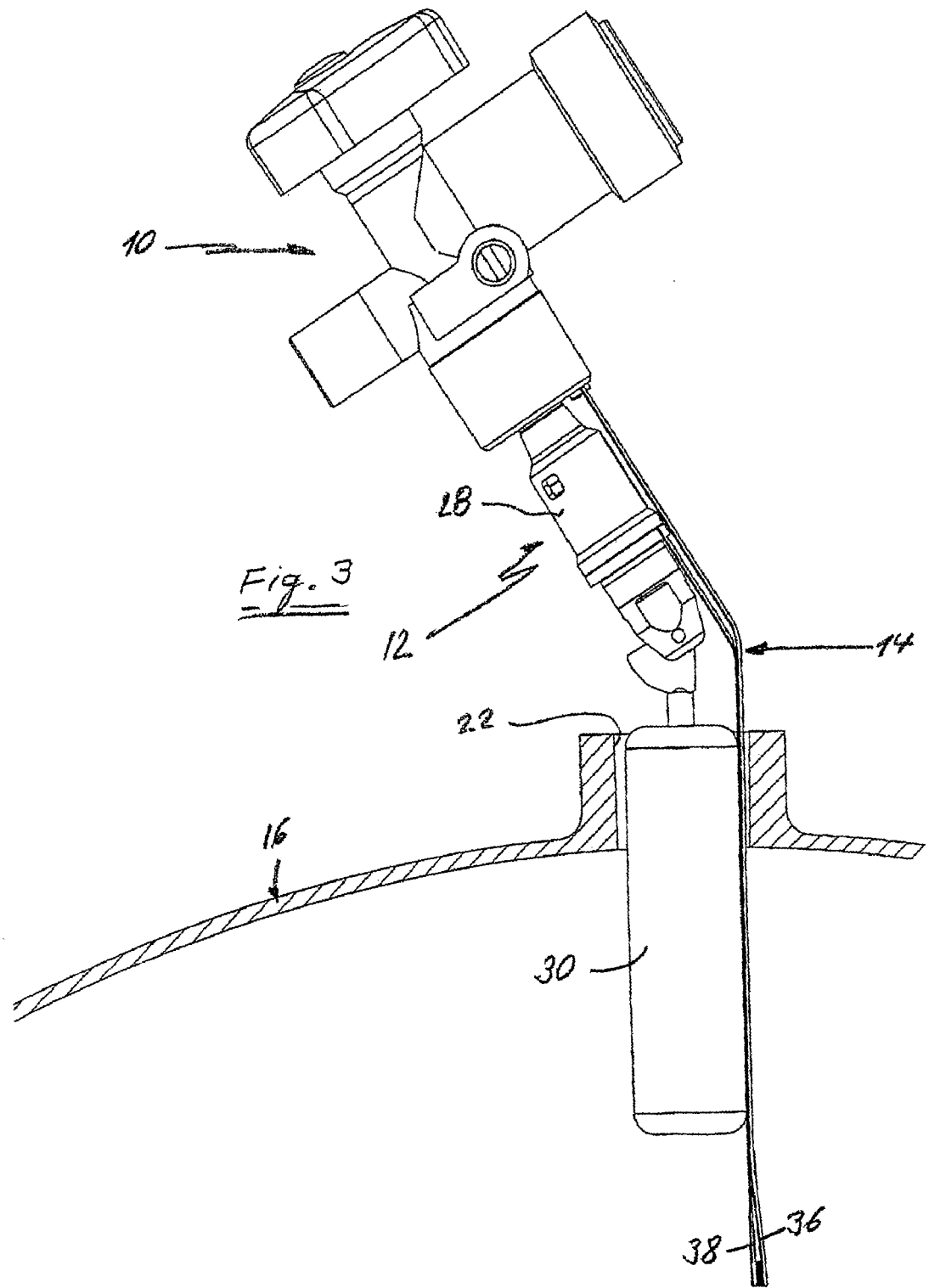
FIG. 3 shows the structure of FIG. 1 in the process of introducing the overfill protection device and level gauge into the gas cylinder.

The invention will now be described in greater detail referring first to FIGS. 1-7 which disclose different embodiments of the capacitive level gauge in combination with a valve assembly having an overfill protection device (OPD). FIG. 1 shows the valve assembly 10 including the overfill protection device 12 and a first embodiment of the capacitive level gauge 14 mounted to a fluid container 16, such as a pressurized liquefied gas cylinder shown partly in cross-section. The valve assembly has a valve body 18 having a base end 20 threadably engaged in an opening 22 of the container 16. Except for the portion of the base end 20 threaded into opening 22 the valve body 18 is located exteriorly of the container 16. The overfill protection device 12 and the capacitive level gauge 14 extend from the base end 20 into the interior of the container 16. The valve assembly 10 including the overfill protection device 12 are shown in greater detail in cross-section in FIG. 4. The construction of the valve assembly 10 and the overfill protection device 12 is well-known and disclosed for example in U.S. Pat. Nos. 5,487,404 and 6,640,829 referred to above, the disclosures of which are incorporated herein by reference. It is only pointed out herein that the valve assembly 10 has a manually openable and closable valve element 24 and a filling/discharge socket 26. The overfill protection device 12 has a fixed body member or housing 28 secured to valve body 18 and to which a float 30 disposed at an angle relative to the housing 28 is pivotably connected. Disposed in the housing 28 are a piston member 32 and a float controlled valve element 34. When the valve element 24 is open and the filling pressure is connected to socket 26 the fluid pressure (liquefied gas) urges the piston 32 into an open position to allow the fluid to enter into the container 16 through an opening 36, note FIG. 1, formed in the housing 28 of the overfill protection device. Further, the fluid under pressure flows around the valve 34 held in open position by the float 30 into the container interior. When the fluid level in the container 16 reaches the float 30, the float 30 is pivoted upwardly causing the valve 34 to close and the pressure below piston 32 to rise thereby urging the piston 32 to its closed position to stop the filling operation.

To discharge fluid from the container 16 the valve element 24 is opened causing the pressure below the piston 32 to decrease and the valve 34 to be lifted off of its seat by the pressure within the container 16 so that fluid from within the container can flow around the valve 34, through the piston 32, and out of the socket 26.

Referring again to FIG. 1, the capacitive level gauge 14 comprises two elongate, relative thin, lamellar foil electrodes 36 and 38 closely spaced apart from one another and electrically insulated from one another. Both electrodes 36, 38 are mounted parallel with respect to one another and extend longitudinally along a longitudinal axis A of the valve assembly deeper in the container 16 than the overfill protection device 12. The first electrode 36 has a proximal end 36-1 connected to the valve body base end 20 at a location laterally spaced radially outwardly from the housing 28 of the overfill protection device 12. This proximal end 36-1 of the first electrode 36 is electrically connected to the electrically conductive, metallic body 18 of the valve 10. The second electrode 38 is on the side of the first electrode 36 facing the overfill protection device 12. The second electrode 38 is shorter than the first electrode 36 and is fixed at its proximal end 38-1 to the housing 28 of the overfill protection device 12, which housing 28 is of electrically insulating, dielectric material. As it can be seen from FIG. 1, the proximal end 38-1 of the second electrode terminates short of the proximal end 36-1 of the first electrode 36, and more particularly the proximal end 38-1 of the second electrode 38 terminates under a portion 28-1 of maximum outer diameter of the housing 28 so that only one of the electrodes, namely the first electrode 36 extends snuggly passed this maximum diameter portion 28-1 of housing 28 on the outer side thereof.

The two electrodes 36 and 38 are shown interconnected adjacent their distal ends 36-2 and 38-2 by an electrically insulating connector 40.

Figure 4:
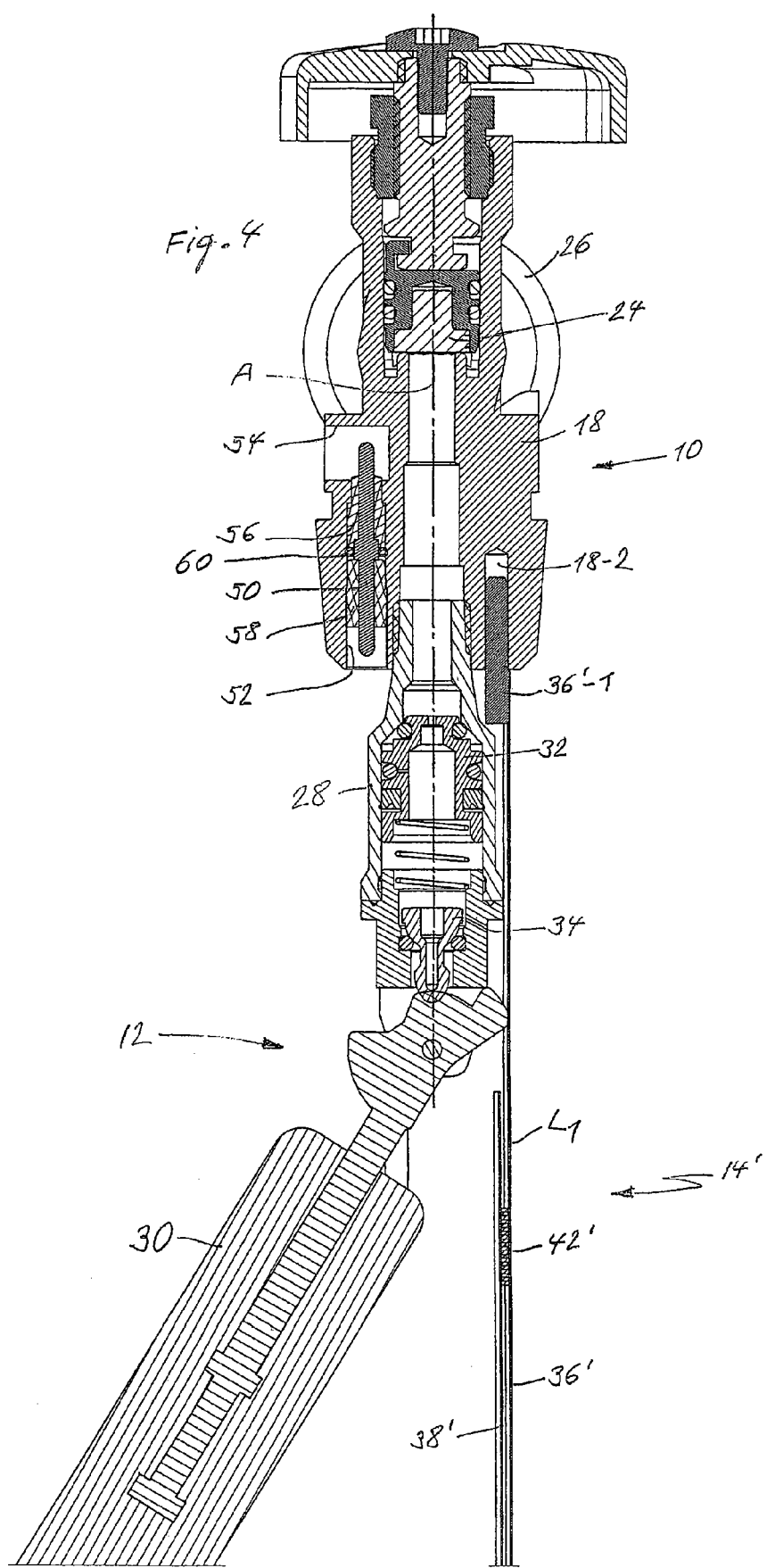
FIG. 4 shows the gas valve and overfill protection device in vertical section and a second embodiment of the level gauge (the float and level sensor being only partly shown).

It is noted that in the normal operative position shown in FIG. 1, the electrodes 36,38 extend in a straight orientation generally parallel to one another and parallel to the longitudinal axis A of the valve 10 and the overfill protection device 12, note also FIG. 4. The electrodes 36, 38 are dimensioned to normally remain stably in this straight condition, in which the electrodes 36 and 38 are parallel with respect to one another and spaced from one another. The electrodes 36 and 38 are both fabricated from flexible spring band steel stock material and can be manually deflected from their straight orientation to a position snuggly adjacent the float 30 to permit insertion of the level gauge 14 and overfill protection device 12 while positioned side-by-side through the opening 22 into the container 16. However, it is essential for the spring force of the electrodes 36 and 38 to return the electrodes 36 and 38 to the recited straight and parallel orientation to stably remain therein when the deflection force ceases or is no longer applied, namely when the gauge 14 and the overfill protection device 12 are in the operative positions thereof within the container interior.

As shown in FIG. 2, which is a cross-sectional view in the description of the arrows A-A in FIG. 1, the level gauge 14, in axial projection, is in close proximity to the housing 28. Both electrodes have opposite parallel longitudinal edges 35 and 37 as well as opposite side surfaces 39 and 41 between the longitudinal edges 35 and 37. Both electrodes 36 and 38 are slightly curved, trough-shaped, or channel-shaped, with the concave side surface 41 facing towards the overfill protection device 12. Further, the electrodes 36 and 38 are closely spaced apart and the overall thickness T of the level gauge 14 measured transversely to the side surfaces 39, 41 is substantially smaller than the width W of the blades 36 and 38 measured between the longitudinal edges 35 and 37 thereof.

The concave side surface 41 of the electrode 36 is in close proximity with the maximum diameter housing portion 28-1 of the overfill protection device 12 and the concave surface 41 of the electrode 38 is in close proximity at a portion of slightly smaller diameter of the housing 28 (shown partly in FIG. 2) of the overfill protection device. Moreover, as shown in FIG. 2, the centers of curvature CC of the curved side surfaces 39, 41 of the electrodes 36 and 38 are preferably on a radial line RL of the housing 28 that passes through the longitudinal axis A and bisects the electrode blades 36, 38. Or, in other words, the side surfaces 39, 41 of the electrodes 36, 38 are oriented or extend substantially transversely to a vertical plane containing the radial line RL and the longitudinal axis A. Further, the electrodes 36, 38 generally overly one another, with a side surface of one electrode being in facing, spaced apart, confronting relationship with a side surface of the other electrode. The float 30 has a pivot axis 30-1 normal to the vertical plane and intersecting the longitudinal axis A and the float 30 extends at an acute angle downwardly away from the overlying electrodes 36, 38. Further, the electrodes 36, 38 are both located circumferentially of the housing member 28 at a location angularly spaced apart about 90° degrees from the pivot axis 30-1 of the float 30 and the electrodes 36, 38 are located relative to the housing 28 diametrically oppositely to the float 30, as shown clearly in FIG. 1. In other words, as shown in FIG. 1, the float 30 extends from the pivot axis 30-1 obliquely downwardly on one side of the longitudinal axis A and the electrode pair 36, 38 is disposed on the other side of the longitudinal axis A, or, in other words, circumferentially about axis A 180° away from float 30.

Referring now to FIG. 3, which shows the overfill protection device 12 and the level gauge 14 in the process of being inserted into the cylinder 16. It can be seen that the float 30 is introduced first through the opening 22 into the cylinder interior with the electrodes 36 and 38 having been displaced or deflected into a position snuggly adjacent the float 30 so that the gauge electrodes 36 and 38 can be inserted into the container 16 with the overfill protection device 12 while positioned alongside the same through the opening 22 which is but slightly larger than the maximum diameter of the overfill protection device 12. As soon as the overfill protection device 12 and the level gauge 14 are fully within the container 16 the electrodes 36 and 38 flex back into their straight parallel position to stably remain therein, as previously described. Thereafter the entire structure including the valve 10, the overfill protection device 12 and the level gauge 14 is rotated for screwing the valve body base end 20 into the container opening 22.

The functioning of the level gauge 14 is based on the capacitive measuring method. The change of electrical capacitance between the two electrodes or electrical conductors 36 and 38 is measured. The electrical capacitance is determined by the permittivity of the environment that surrounds the electrodes 36 and 38. There is a relevant difference in typical permittivity between the gas phase and the liquid phase of the fluid contained in the container 16, for example pressurized gas such as propane/butane. By measuring the change of the gauge capacitance it is possible to determine the liquid coverage of the electrodes 36 and 38 and accordingly the level of the liquid in the container 16, as is well known.

Because of the unique shape and construction of the gauge 14 it is possible to determine the liquid level inside the container in a reliable way while leaving the valve 10 and the overfill protection device 12 as well as the container 16 more or less in their original shapes and dimensions. The electronic circuitry is on an electronic circuit board shown schematically in FIG. 1 by box 42 exteriorly of valve body 18, but the circuit board 42 is preferably fixed to the gauge 14 comprising the electrodes 36, 38 as will be described later. The electronic circuitry coverts the measured change of capacitance into an electronic output signal that will be transmitted to a display unit 44 or other interface device connectable to the electrical outlet or socket 18-1 of the valve body 18. An electric power source such as a battery, not shown, may be provided in the display unit 44 or valve body 18. An electrical wire 48 schematically shown in dotted lines in FIG. 1 extends from an electrical terminal 46, shown schematically in FIG. 1, of the socket 18-1 to the electrode 38. The other electrical connection to complete the current path is from the other electrode 36 through the metallic valve body 18 to the socket 18-1. Although a remote display unit 44 is schematically shown in FIG. 1, the display unit 44 is preferably fixed directly to the valve body 18.

The electronic circuitry or converter of circuit board 42 will be described later with reference to FIG. 11.

Figure 5:
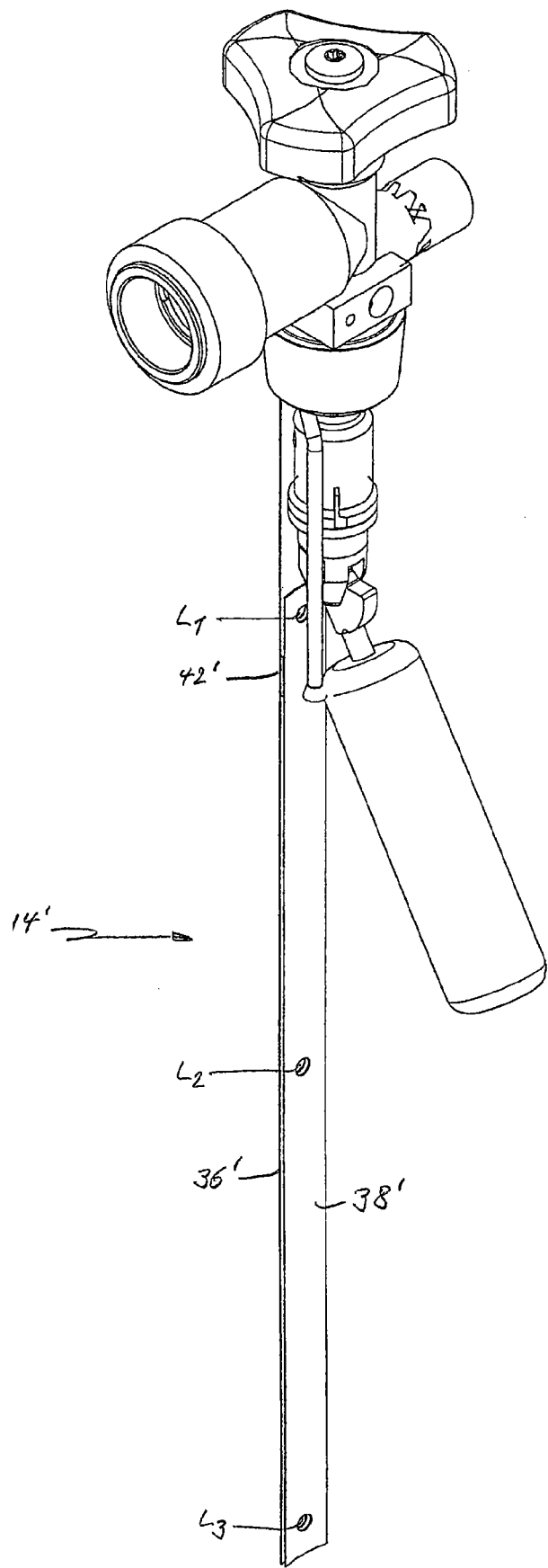
FIG. 5 shows the structure of FIG. 4 in an elevational side view (the float and level gauge being shown in full).

Returning now to FIG. 4, in addition to the representation of the valve 10 and overfill protection device 12 in cross-section, this Figure also shows an alternate embodiment of the gauge designated by reference numeral 14' and comprising a first electrode 36' having a thickened proximal end portion 36'-1 press-fitted into a hole 18-2 of the valve body 18. The second electrode 38' is not connected to the housing 28 of the overfill protection device 12, as in FIGS. 1-3, but is connected (electrically non-conductively) only to the first electrode 36' at at least three locations $L_1$, $L_2$ and $L_3$, note FIG. 5 which shows the embodiment of FIG. 4 in a perspective view. In FIGS. 4 and 5 only the holes through the electrodes 36' and 38' are shown at the connector locations $L_1$, $L_2$ and $L_3$ but the connectors per se have been omitted. The lowermost connector location $L_3$ is in proximity of the distal ends of the electrodes 36' and 38' and the uppermost connector location $L_1$ is adjacent the proximal end of the shorter electrode 38'. The intermediate connector location $L_2$ is approximately midway between the connector locations $L_1$ and $L_3$. Additional intermediate connectors may be provided, depending on the length of the electrodes 36' and 38'. For relatively short electrodes it may be sufficient to have only the two connector locations $L_1$ and $L_3$. In this embodiment of the gauge 14' it may be sufficient for the first electrode 36' to be flexible to permit lateral deflection of a distal portion of the gauge 14' into close proximity with the float 30 when it is desired to insert the overfill protection device 12 and the gauge 14' into the container (not shown in FIGS. 4 and 5), but preferably both electrodes 36', 38' are flexible.

Further, in the embodiment of FIGS. 4 and 5 the electronic circuit board 42' is shown sandwiched between both electrodes 36' and 38'.

The valve body 18 has an electrically conductive interface pin 50 inserted in a bore 52 extending from a lower end face of the body 18 to a socket opening 54 for receiving a connector portion of the display unit or other interface device 44, not shown in FIGS. 4 and 5. The conductive pin 50 is securely fixed in the bore 52 by means of two non-conductive bushings 56 and 58 press-fitted into the bore 52, with a seal 60 being interposed between the bushings 56 and 58. A conductive wire, not shown in FIGS. 4 and 5, extends from the lower end of the conductive pin 50 to the circuit board 42'.

Another alternate embodiment of the invention will now be described with reference to FIGS. 6 and 7. This embodiment is similar to the embodiment of FIGS. 4 and 5, except that the first electrode 36" is provided intermediate the proximal end 36"-1 and the distal end 36"-2 with a pivot hinge 62 dividing the first electrode 36" into an upper or proximal portion 36"-3 and a lower or distal portion 36"-4. In this alternate embodiment of the gauge 14", although the electrodes 36" and 38" may be flexible, they need not be flexible but can be stiff to normally remain in their straight orientation with the electrodes 36" and 38" parallel with one another. To allow for insertion of the sensor 14" and the overfill protection device 12 into a container, not shown in FIG. 6, the lower or distal portion 36"-4 of the first electrode 36', carrying the second electrode 38" is pivoted towards the float 30 to be positioned snuggly alongside the same. This pivot motion of the lower distal portion 36"-4 with respect to the upper proximal portion 36"-3 is permitted by the pivot hinge 62 which is located generally adjacent the float pivot 30-1.

Figure 6:
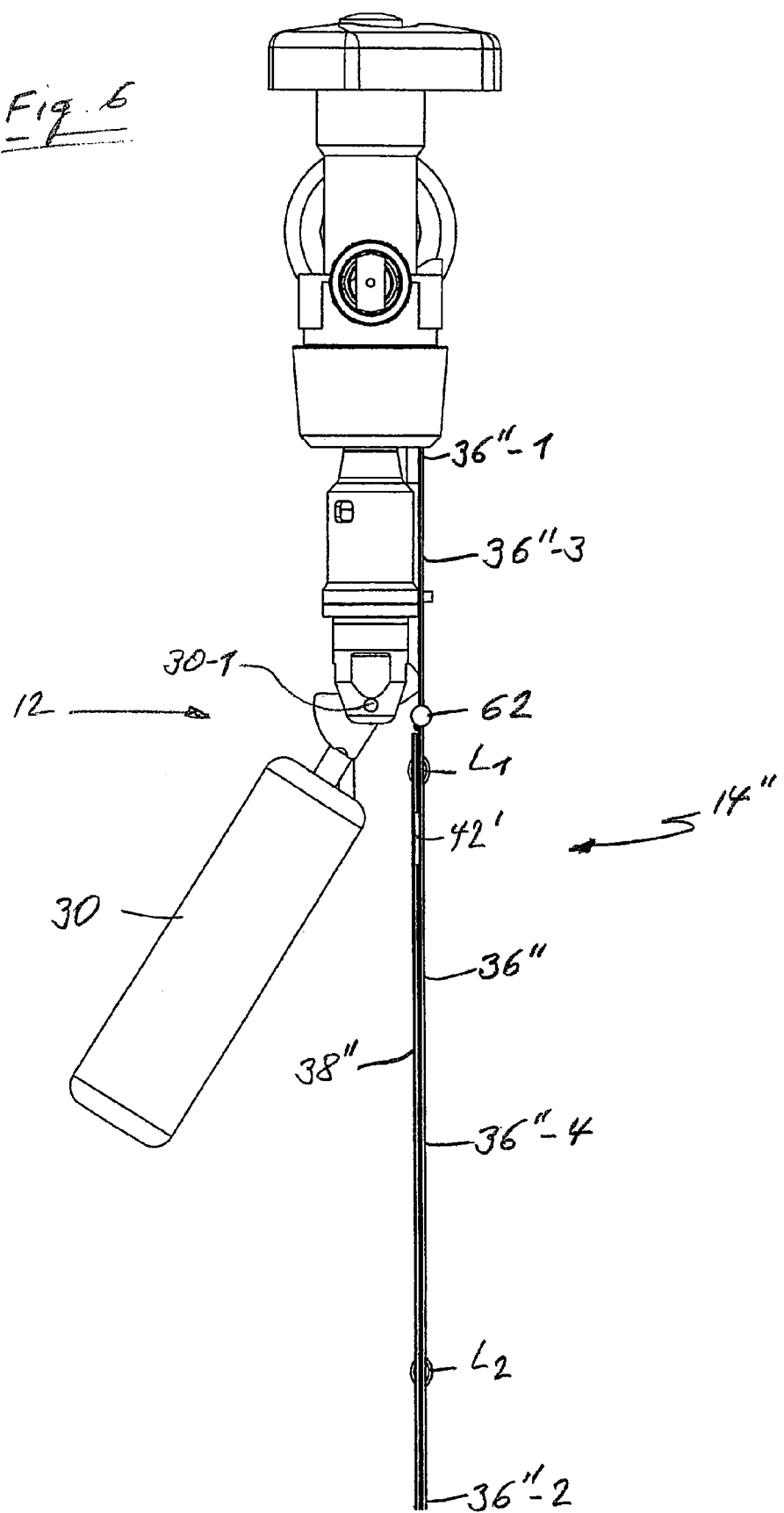
FIG. 6 shows the gas valve with overfill protection device and a third embodiment of the level gauge having a pivot hinge.
Figure 7:
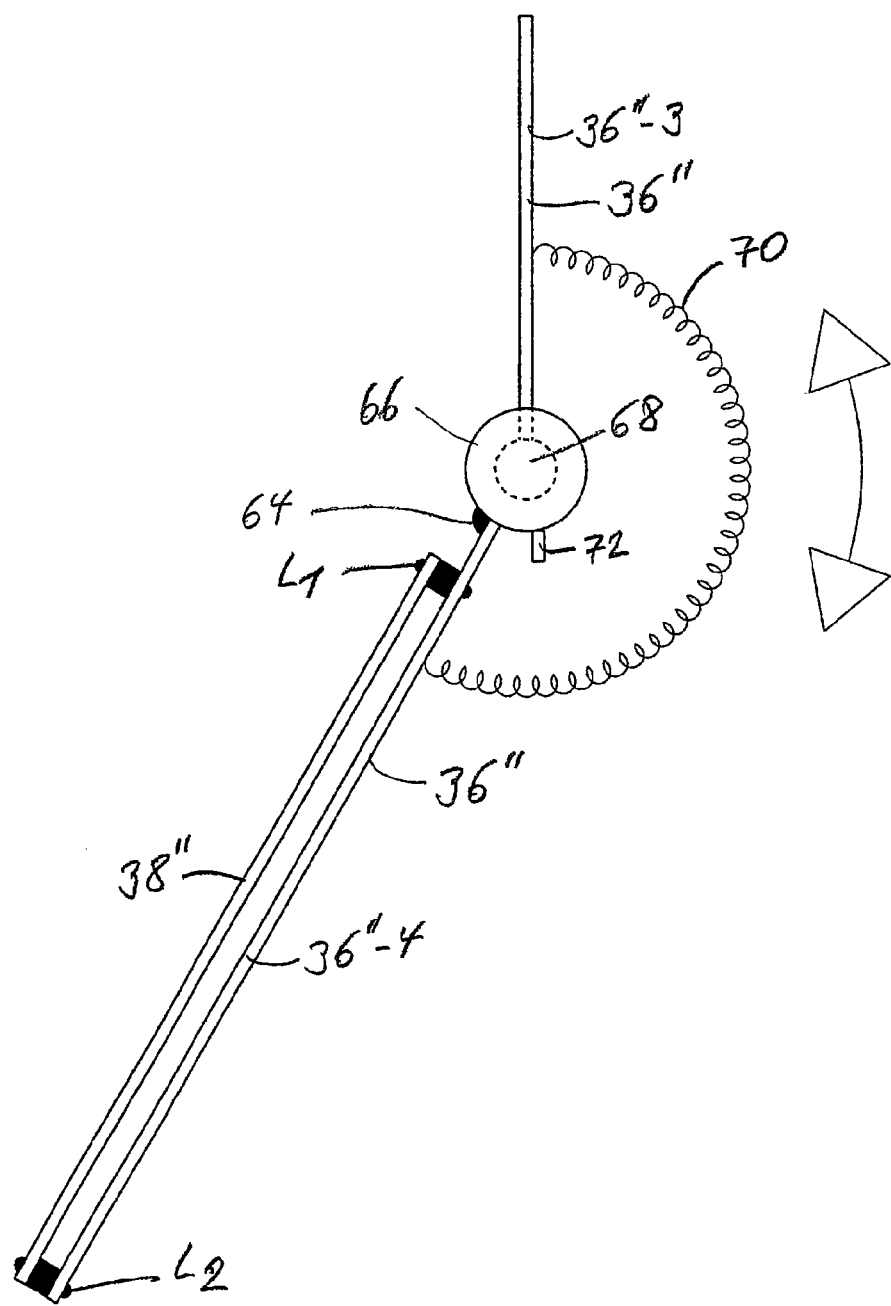
FIG. 7 is an enlarged view of the pivot hinge with a return spring.

The pivot hinge 62 is more clearly shown in FIG. 7. As shown in FIG. 7 the lower or distal portion 36"-4 is shown welded, at 64, or otherwise secured, to an outer hinge member 66 while the upper or proximal portion 36"-3 is fixed to an inner hinge member 68 about which the outer hinge member 66 is rotatable. A spring means, schematically shown in FIG. 7 at 70, connects between the upper portion 36"-3 of the first electrode 36" and the lower portion 36"-4 thereof. The spring 70 normally retains both portions 36"-3 and 36"-4 in a straight, aligned condition, shown in FIG. 6, wherein the lower portion 36"-4 is in engagement with a fixed or stationary stop 72. When the lower portion 36"-4 is pivoted towards the float, not shown in FIG. 7, the spring 70 is tensioned and the spring force returns the pivoted portion 36"-4 into its normal operative position in engagement with stop 72 when the deflection or pivoting force is no longer applied. Although the spring 70 is shown in a substantial radial distance from the hinge 62 it is in effect closely adjacent thereto.

It is also pointed out that in the embodiment of FIGS. 6 and 7 there are provided only two connector locations $L_1$ and $L_2$ between the electrodes 36" and 38". The electronic circuit board 42' is shown sandwiched, in FIG. 6, between the electrodes 36" and 38" but is not shown in FIG. 7.

Figure 8:
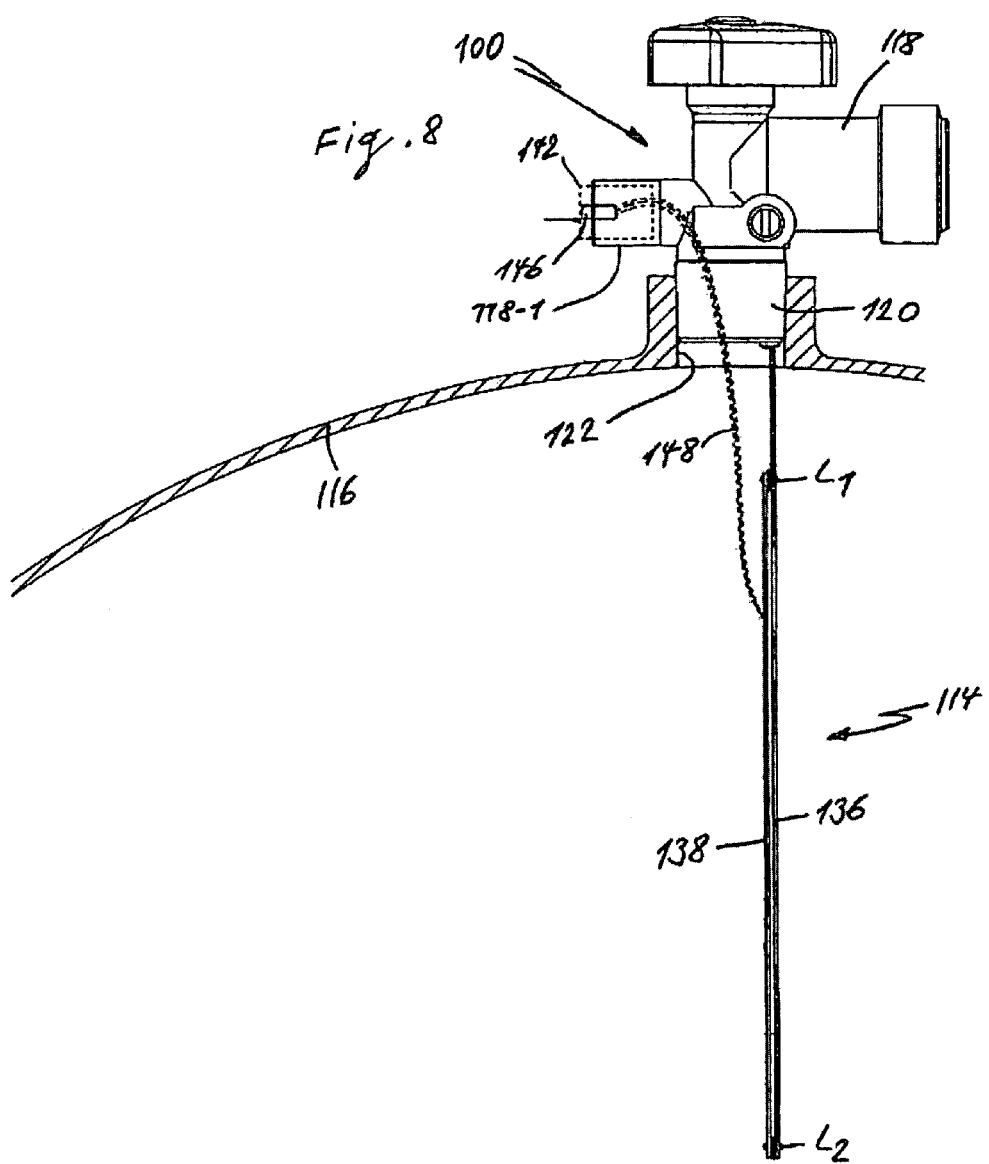
FIG. 8 shows the level gauge provided on a valve assembly without overfill protection device.
Figure 9:
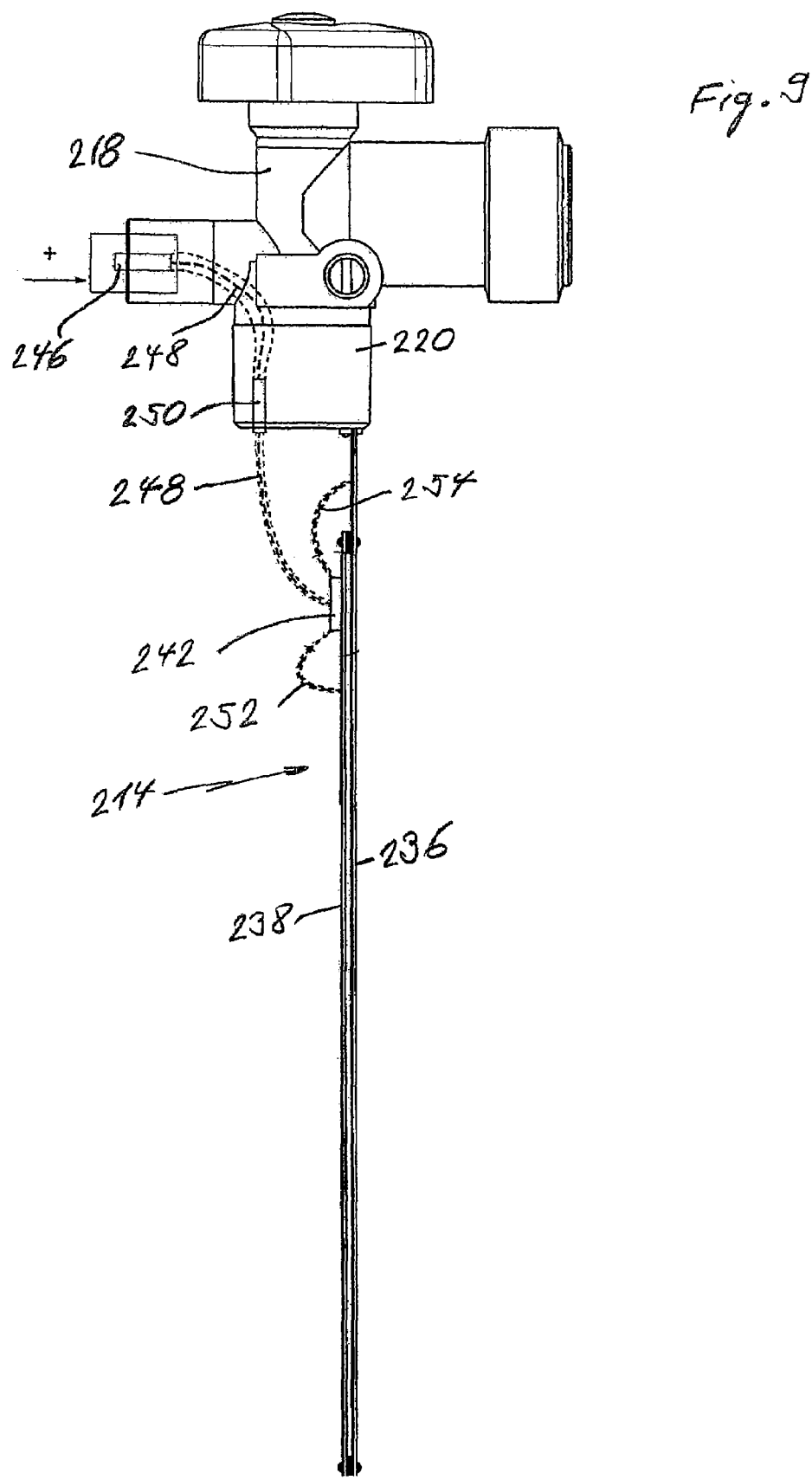
FIG. 9 shows the fluid control valve and level gauge of FIG. 8 with an electronic circuit board incorporating the electrical conversion circuitry for measuring the capacitance and calculating in response to the measured capacitance an output signal representing the liquid level.

The gauge of the invention may also be used with a valve assembly without overfill protection device as shown in FIGS. 8 and 9.

In FIG. 8 a valve 100 is shown having a base end 120 threaded into a container opening 122 and a level gauge 114 depends from the base end 120 and extends into the interior of the container 116. The gauge 114 is generally similar to FIG. 6 but there is no need for a pivot hinge and furthermore the sensor blades or electrodes 136 and 138 need not be flexible, but can be flexible or provided with a pivot hinge, if desired. The second electrode 138 is fixed at two locations $L_1$ and $L_2$ to the first electrode or blade 136. Additional connecting locations may be provided intermediate the location $L_1$ and $L_2$, if necessary. As in the embodiment of FIG. 1 a lead wire 148 (shown in dotted lines) extends from the second electrode 138 to an electrical terminal 146 provided of the electrical outlet or socket 118-1 exteriorly of the container 116.

The embodiment of FIG. 9 is generally similar to the embodiment of FIG. 8 except that the electronic circuit board 242 is shown fixed to electrode 238. A coaxial lead wire 248 extends from the electrical terminal 246 to the electronic circuit board 242. The lead wire 248 has a first portion extending from the terminal 246 to an interface pin 250 gas tightly mounted in an opening of the valve base portion 220 and the wire 248 has a second portion extending from the pin 250 to the circuit board 242 connected to the electrode or sensor blade 238. Two additional wires 252 and 254 lead from the circuit board 242 to the electrode 238 and to the electrode 236. As in the embodiment of FIG. 8, the gauge 214 of the FIG. 9 embodiment need not be flexible or provided with a pivot hinge, but can be flexible or provided with a pivot hinge, if desired. Again, there may be a remote display (not shown) or a display means may be fixed directly to the valve body 218.

Figure 10:
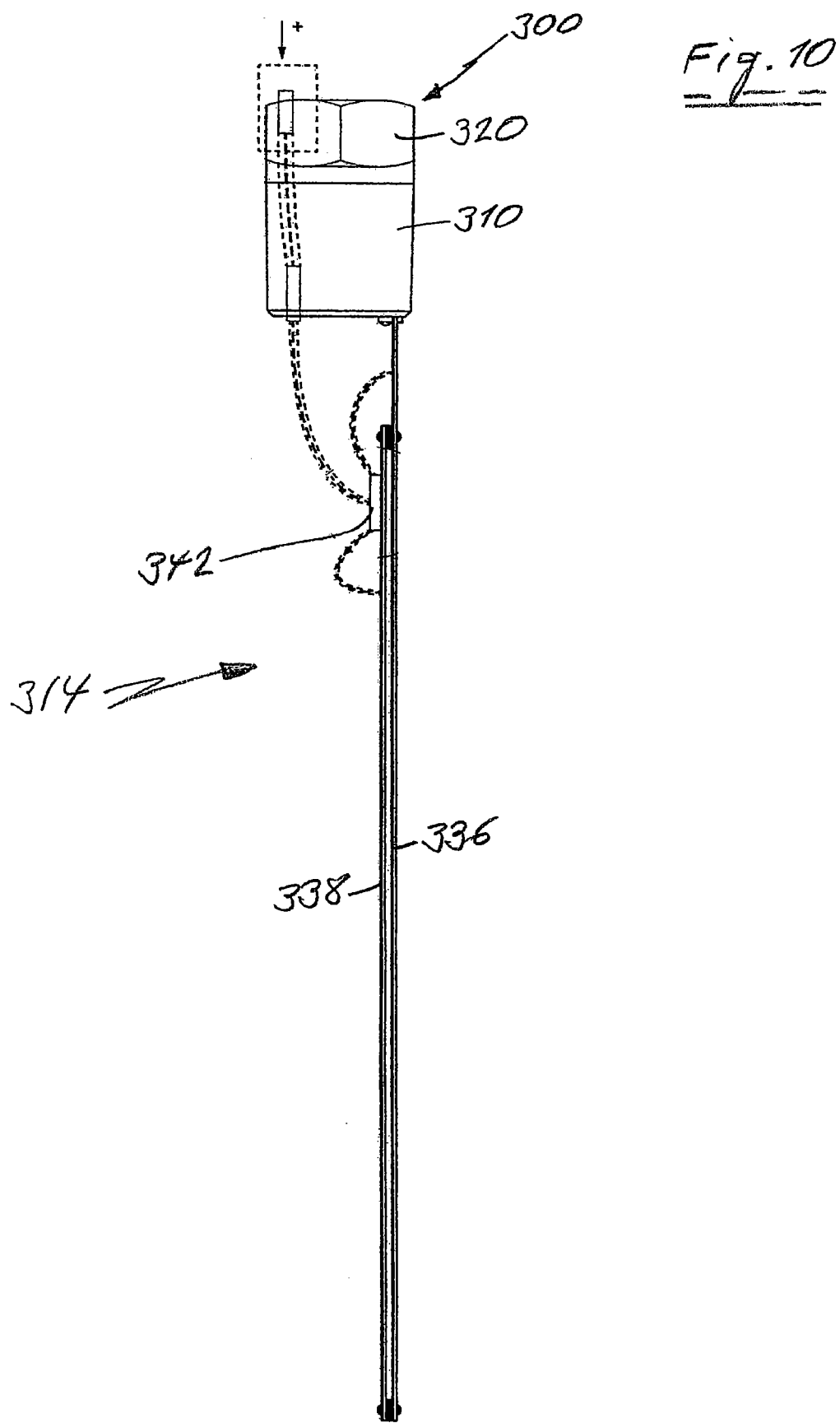
FIG. 10 is similar to FIG. 9 but shows the capacitive level gauge of the invention, independently of a valve assembly and OPD.

Further, the invention can be used in a level gauge independently of a valve assembly. Indeed, an electrode assembly consisting of the electrodes 336 and 338 may be fixed to a gauge head, as shown in the FIG. 10 embodiment. In FIG. 10 the gauge or level sensor has a gauge head 300 having a lower threaded portion 310 for threading into an opening of a fluid container (not shown). The gauge head 300 has an upper portion of hexagonal form or other appropriate shape for engagement by a tool (not shown) to permit mounting of the gauge 314 in a container opening (not shown). The electrode blades 336 and 338 as well as the electric circuitry or converter board 342 and the electric connections thereof are as previously described, but the electrodes 336, 338 need not be flexible or provided with a pivot hinge, but can be flexible or provided with a pivot hinge, if desired.

Figure 11:
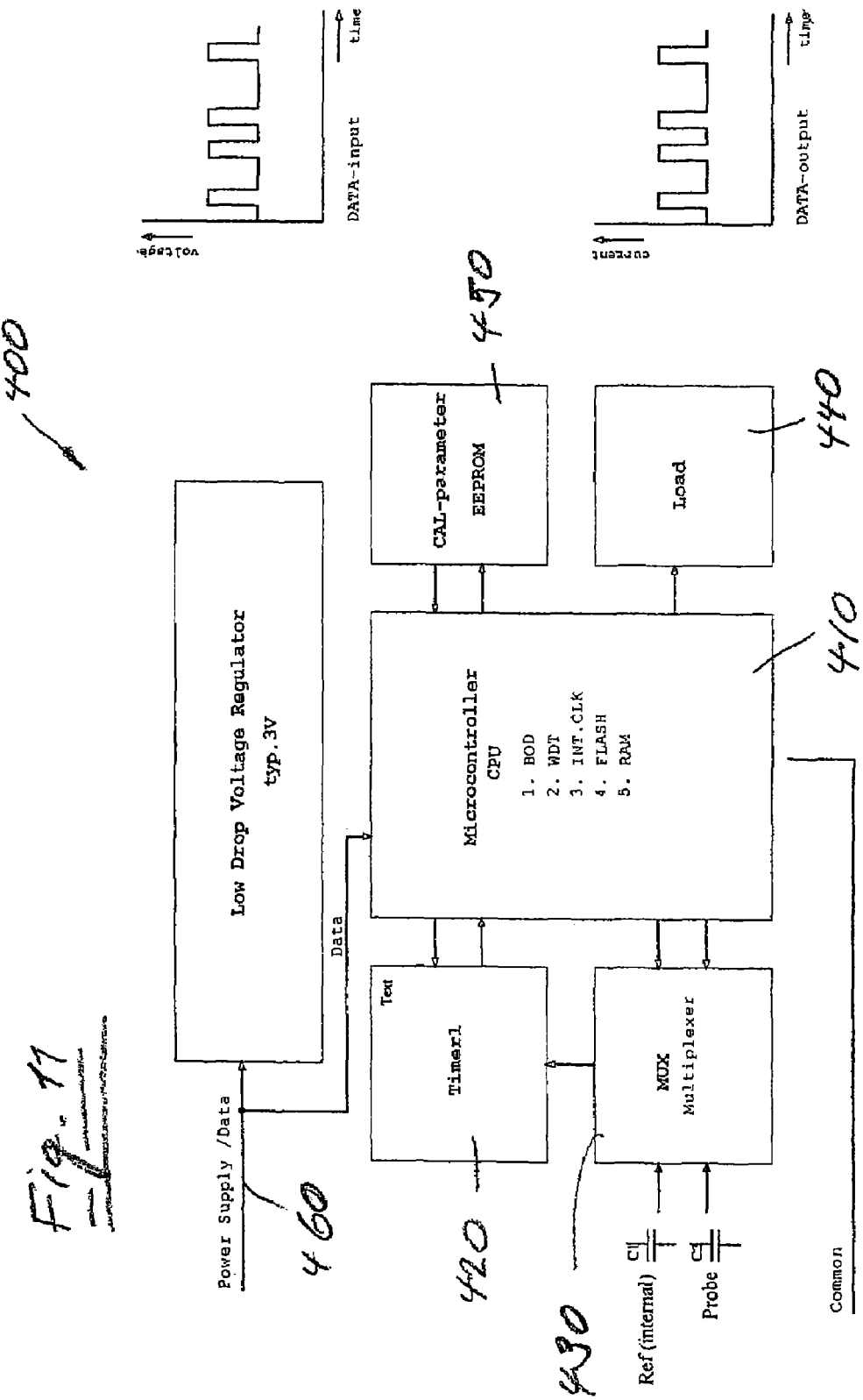
FIG. 11 is a block diagram of the electrical conversion circuitry. Corresponding reference numerals will be used throughout the several figures of the drawings.

The block diagram 400 of FIG. 11 shows the functional components of the electronic circuitry of the circuit board 42, 42', 142, 242 or 342. To determine the gauge or probe capacitance (C2) in relation to the known and stable reference capacitance (C1) the microcontroller 410 measures the time needed for a certain number of oscillation cycles of timer 420 in three different modes of multiplexer 430:
1. gauge or probe capacitance C2 connected
2. reference capacitance C1 connected
3. no external capacitance connected Possible influences by temperature, signal delays, voltage variations etc. are compensated, the measured capacitance is directly related to the very stable reference capacitance C1. By calibration of the converter in both empty and at full, the actual level can be determined by the result of the actual capacitance measurement. The result of a level measurement is a relative value of height, presuming that the gauge has a linear characteristic, otherwise any non-linearity can be compensated by the microcontroller 410. The output signal (DATA-output) is a serial datastream, represented by modulating the consumed current by switching the load (resistor) 440 on and off. This allows a so called single-wire connection, the other connection to make a current loop, is established by the metallic part of the valve itself. The output signed is easily measured by sensing the current consumed by the electronic circuit.

The calibration data are stored in a semi-permanent memory (EEPROM) 450. Once calibrated the converter uses this data to calculate the actual level. Only a re-calibration will change these reference data. The power-supply line 460 is voltage modulated by the calibration-unit (see DATA-input).

Summary of technical data (preliminary)
supply voltage 3.15 V
current consumption (active) typ.3 mA
measuring cycle typ.200 ms The overall accuracy and performance of the gauge depends mainly on gauge stability, calibration of the electronics, gas compensation, etc., the compared influence of the electronics are negligible.

The advantages of this concept are:
1. single-wire connection
2. robust signal throughput
  (no sensitive capacitance connection)
3. local calibration of gauge,
  eventual initial gauge tolerances are eliminated
4. wide power-supply range
5. well-protected converter electronics
6. low-power The invention is not limited to the previously described embodiments. Modifications can be made to these embodiments without departure from the spirit or scope of the invention. For example, both electrodes could be supported only from the overfill protection device, or only one of the electrodes could be secured to the overfill protection device and the other electrode secured only to the one electrode, however, in this case an electrical return wire is necessary from the other electrode to the electrical outlet. Also, instead of being metallic, the valve body or gauge head may be of plastic material, but then an electrical return wire is necessary from the electrode secured to the valve body or gauge head back to a terminal of the electrical outlet. Also, both electrodes may be secured at the proximal ends thereof the valve body or gauge head, with the proximal end of one of the electrodes being electrically insulated from the proximal end of the other electrode. In this case, in the application of a valve with an overfill protection device, more space is needed for inserting the sensor electrodes and the overfill protection device disposed side-by-side into the container as both electrodes will extend passed the maximum diameter portion of the overfill protection device. Finally, instead of the overfill protection device having an angularly disposed float, the overfill protection device may have a float axially movable up and down along the longitudinal axis A.

Further, instead of being curved, both electrodes may have in cross-section a generally flat mid-portion and side portions inclined or angularly disposed relative to the mid-portion.

The display 44 may be any known display device such as an LED-display, or a direct reading or pointer display such as a dial indicator or a remote indicator display.

Although the invention has been described with reference to the application for determining the level of liquid gas in a pressurized gas container it is pointed out that the gauge could also be used for example, without limitation, to detect the fuel level in a fuel tank.

The invention claimed is:

1. A valve assembly for a fluid container comprising:
   a valve body having a longitudinal axis and a base end adapted to secure the valve body in an opening of the container;
   a capacitive liquid level gauge for detecting the liquid level in the container, said level gauge being secured to said valve body base end and extending downwardly therefrom in the direction of the longitudinal axis, said level gauge comprising two elongate, relatively thin lamellar, conductive electrodes, said electrodes having a length and normally remaining in straight parallel condition spaced apart from one another in the direction of the length thereof; and
   a circuit board having an electronic converter circuit for measuring the electrical capacitance between the two electrodes and producing in response to said measured capacitance an outlet signal representative of the liquid level in the container; said electronic converter circuit being adapted to modify the power consumed from a power supply in response to the liquid level detected in the fluid container, the modification of the power consumed being in response to a modulation in the electric current consumed by a load means controlled by said electronic converter circuit.

2. The valve assembly of claim 1, in which said electronic converter circuit comprises microprocessor means adapted to calculate the liquid level from the detected capacitance.

3. The valve assembly of claim 1, in which said electronic converter circuit comprises a reference capacitor means for calculating the liquid level from the detected capacitance.

4. The valve assembly of claim 1, in which said electronic converter circuit further comprises a timer means, and the capacitance between the electrodes is detected from the time elapsed for a predetermined number of oscillation cycles of said timer means.

5. The valve assembly of claim 1, wherein each electrode has opposite side surfaces, and the electrodes are arranged in overlying relationship, with one of the side surfaces of one electrode facing a side surface of the other electrode.

6. The valve assembly of claim 1, wherein both of the electrodes are trough-shaped in cross-section; said electrodes being oriented with a concave side thereof facing in the same direction.

7. The valve assembly of claim 1, wherein both of the electrodes are curved in cross-section; said electrodes being oriented with a concave side thereof facing in the same direction.

8. The valve assembly of claim 1, wherein said at least one electrode is trough-shaped in transverse cross-section with a concave side and an oppositely facing convex side.

9. The valve assembly of claim 1, wherein both of said electrodes are comprised of flexible spring band material.

10. The valve assembly of claim 1, wherein both electrodes are generally identical in cross-sectional shape.

11. The valve assembly of claim 1, wherein a first electrode of the two electrodes is secured to said valve body base end and a second electrode of the two electrodes is electrically non-conductively secured at least adjacent a proximal and a distal end thereof to said first electrode, and said valve body base end is electrically conductive.

12. The valve assembly of claim 1, wherein the circuit board is mounted on the level gauge.

13. The valve assembly of claim 1, comprising a single wire connection to said circuit board, the electrical return being through said valve body, said valve body being comprised of electrically conductive material.

14. The valve assembly of claim 1, having a display means mounted on said valve body, said display means receiving said outlet signal and indicating said liquid level in said container responsive to said output signal.

15. The valve assembly of claim 1, wherein the valve body has an electrical outlet and a remote display means is connected to said outlet, said display means receiving said output signal and indicating said liquid level in the container in response to said outlet signal.

16. A capacitive liquid level gauge for sensing the liquid level in a pressurized liquefied gas cylinder; the level gauge comprising:
   a gauge head;
   an electrode assembly secured to said gauge head and depending downwardly therefrom, said electrode assembly comprising a pair of elongate, relatively thin, lamellar conductive electrodes, said electrodes each having a length and being formed to normally remain straight spaced apart from one another and parallel to one another in the direction of the length thereof; and
   a circuit board having an electronic converter circuit for measuring the electrical capacitance between the two electrodes and producing in response to said measured capacitance an outlet signal representative of the liquid level; said electronic converter circuit being adapted to modify the power consumed from a power supply in response to the liquid level detected in a fluid container in which the gauge is placed, the modification of the power consumed being in response to a modulation in the electric current consumed by a load means controlled by said electronic converter circuit.

17. The level gauge of claim 16, in which said electronic converter circuit comprises microprocessor means adapted to calculate the liquid level from the detected capacitance.

18. The level gauge of claim 16, in which said electronic converter circuit comprises a reference capacitor means for calculating the liquid level from the detected capacitance.

19. The level gauge of claim 16, in which said electronic converter circuit further comprises a timer means, and the capacitance between the electrodes is detected from the time elapsed for a predetermined number of oscillation cycles of said timer means.

20. The level gauge of claim 16, wherein each of said electrodes has opposite side surfaces, and the electrodes are arranged in overlying relationship, with one of the side surfaces of one electrode facing a side surface of the other electrode.

21. The level gauge of claim 16, wherein both of the electrodes are trough-shaped in cross-section; said electrodes being oriented with a concave side thereof facing in the same direction.

22. The level gauge of claim 16, wherein both of the electrodes are curved in cross-section; said electrodes being oriented with a concave side thereof facing in the same direction.

23. The level gauge of claim 16, wherein said at least one electrode is trough-shaped in transverse cross-section with a concave side and an oppositely facing convex side.

24. The level gauge of claim 16, wherein both electrodes are comprised of flexible spring band material.

25. The level gauge of claim 16, wherein both electrodes are generally identical in cross-sectional shape.

26. The level gauge of claim 16, wherein said gauge head is electrically non-conductive, a first electrode of said two electrodes being secured to said gauge head end and a second electrode of the two electrodes being electrically non-conductively secured at least adjacent a proximal and a distal end thereof to said first electrode.

27. The level gauge of claim 16, wherein the circuit board is mounted on said electrode assembly.

28. The level gauge of claim 16, comprising a single wire connection to said circuit board, the electrical return being through said gauge head, said gauge head being comprised of electrically conductive material.

29. The level gauge of claim 16, having a display means mounted on said gauge head, said display means receiving said outlet signal and indicating said liquid level in a container in which the gauge is placed in response to said output signal.

30. The level gauge of claim 16, wherein said gauge head has an electrical outlet and a remote display means is connected to said outlet, said display means receiving said output signal and indicating said liquid level in a container in which the gauge is placed in response to said outlet signal.

31. The level gauge of claim 16 wherein the gauge head is a valve body.

* * * * *